(12) United States Patent
Gailloux et al.

(10) Patent No.: US 11,783,341 B1
(45) Date of Patent: Oct. 10, 2023

(54) SYSTEM AND METHOD OF IDENTIFYING FRAUD INDICATORS WITHIN TELECOMMUNICATIONS NETWORKS

(71) Applicant: T-Mobile Innovations LLC, Overland Park, KS (US)

(72) Inventors: Michael A. Gailloux, Overland Park, KS (US); Lauren Ricardo St. Aubyn King, Somerset, NJ (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 1,825 days.

(21) Appl. No.: 14/882,064

(22) Filed: Oct. 13, 2015

(51) Int. Cl.
*G06Q 20/32* (2012.01)
*G06Q 20/40* (2012.01)
*H04W 12/12* (2021.01)
*H04W 8/18* (2009.01)
*H04W 12/06* (2021.01)
*H04L 9/40* (2022.01)

(52) U.S. Cl.
CPC ....... *G06Q 20/4016* (2013.01); *G06Q 20/3227* (2013.01); *H04L 63/0876* (2013.01); *H04W 8/18* (2013.01); *H04W 12/06* (2013.01); *H04W 12/12* (2013.01)

(58) Field of Classification Search
CPC ........ G06Q 20/32; H04W 12/06; H04W 28/02
See application file for complete search history.

(56) References Cited

U.S. PATENT DOCUMENTS

| | | | | |
|---|---|---|---|---|
| 2002/0039911 | A1* | 4/2002 | Mountain et al. | H04H 40/18 455/566 |
| 2013/0165072 | A1* | 6/2013 | Hoover et al. | H04W 12/35 455/411 |
| 2015/0038120 | A1* | 2/2015 | Larkin | G06Q 20/326 455/411 |

* cited by examiner

*Primary Examiner* — Steven S Kim
*Assistant Examiner* — Nakia Leffall-Allen

(57) ABSTRACT

An identity theft mitigation system. The system comprises a mobile communication device transfer data store, a non-transitory memory, a processor, and an application stored in the non-transitory memory. When executed by the processor the application monitors transfers of mobile communication device credentials between different mobile communication devices and stores records of the transfers of mobile communication device credentials in the mobile communication device transfer data store. The application further identifies when a mobile communication device is involved in a number of credential transfers that is above a predefined threshold during a period of time based on searching the mobile communication device transfer data store for records of transfers the mobile communication device was involved in, and takes action based on the number of credential transfers in which the mobile communication device is involved exceeding the predefined threshold.

7 Claims, 4 Drawing Sheets

SYSTEM AND METHOD OF IDENTIFYING FRAUD INDICATORS WITHIN TELECOMMUNICATIONS NETWORKS

BACKGROUND

Mobile phones may be replaced by users to upgrade from an earlier model of phone to a later model of phone. Users may desire to keep some elements of their wireless communication credentials unchanged across such device migrations. For example, the user typically prefers to keep his or her phone number unchanged across a device migration. Users may wish to transfer a contacts dictionary or contacts list across from the previous device to the new device. Users may wish to transfer some use history, for example text message history. In some cases a subscriber identity module (SIM) card may be transferred from a previous device to a new device to transport at least some of the communication credentials from the previous device to the new device. Changing mobile phones may be referred to as device swaps in some contexts. If there is some problem with the new mobile phone, the user may desirably swap back from the new phone to the previous phone and return the new phone for a purchase refund or some like transaction. In some cases the wireless communication service provider may be engaged to promote the device swap, so that the new device is properly configured for communication on the radio access network.

SUMMARY

In an embodiment, an identity theft mitigation system is disclosed. The system comprises a mobile communication device transfer data store, a non-transitory memory, a processor, and an application stored in the non-transitory memory. When executed by the processor the application monitors transfers of mobile communication device credentials between different mobile communication devices and stores records of the transfers of mobile communication device credentials in the mobile communication device transfer data store. The application further identifies when a mobile communication device is involved in a number of credential transfers that is above a predefined threshold during a period of time based on searching the mobile communication device transfer data store for records of transfers the mobile communication device was involved in, and takes action based on the number of credential transfers in which the mobile communication device is involved exceeding the predefined threshold.

In an embodiment, a method of reducing financial account fraud is disclosed. The method comprises receiving by a computer system a request for a financial transaction, wherein the request identifies a mobile communication device as an authentication credential of the transaction and the transaction is one of opening a new credit card account, opening a new customer purchasing account, transferring money from an existing account, or reading a current account balance, requesting by the computer system a fraud risk assessment based on the identity of the mobile communication device, wherein the assessment is determined based on a number of times the mobile communication device has been involved in a device swap, and, based on the fraud risk assessment exceeding a predefined threshold, taking action by the computer system by responding to the financial transaction request by changing a normal request fulfillment process.

In an embodiment, a method of mitigation identity theft based on monitoring mobile communication device identity swapping is disclosed. The method comprises storing information about requests to transfer a mobile communication device credential between different mobile communication devices in a device swap data store by a computer system and receiving a request to transfer a mobile communication device credential from a first mobile communication device to a second mobile communication device. The method further comprises, in response to receiving the request, looking up by the computer system in the device swap data store information about requests to transfer credentials based on an identity of the first mobile communication device and on an identity of the second mobile communication device, determining by the computer system that a number or requests to transfer credentials associated with one of the first mobile communication device and the second mobile communication device exceeds a predefined number of credential transfers per period of time, and, based on determining that the number of requests exceeds the predefined number of credential transfers, taking action by the computer system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
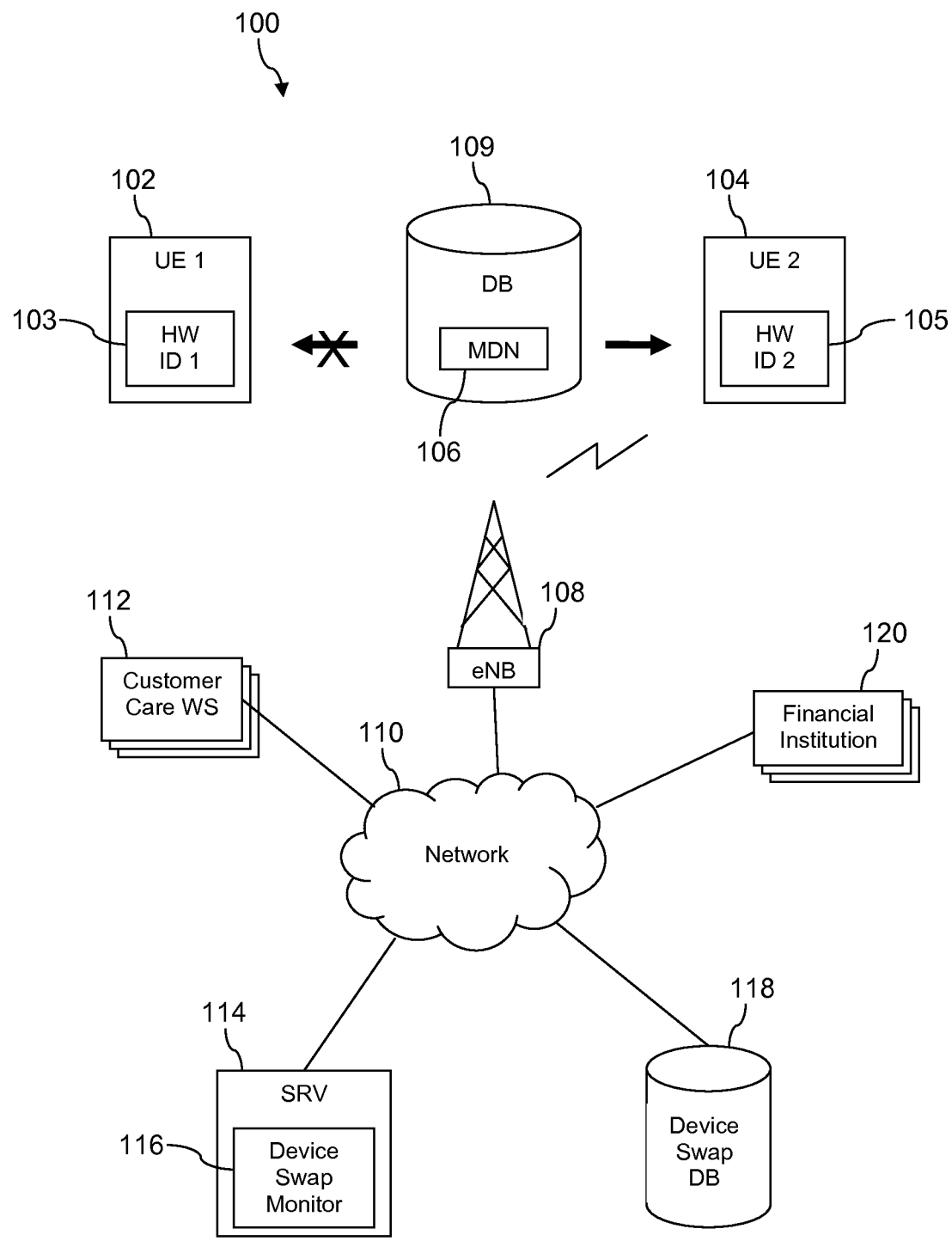
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Financial institutions are often victimized by fraud, such as identity theft. A fraudster may open a financial account in the name of a legitimate individual with a solid track record of financial responsibility, extract money from the newly opened account, and leave the financial institution responsible for the extracted money when the legitimate individual demonstrates that he or she was not involved and instead the financial institution was duped. For example, a fraudster may obtain information about an innocent individual's mobile communication device (e.g., smart phone), call the wireless communication service provider associated with the victim's mobile communication device, request that the phone number of the legitimate device be swapped to a "new" device that is in the possession of the fraudster. If the fraudster can provide adequate corroborating information, the wireless service provider may perform the requested device swap (i.e., reprovision the radio access network (RAN) to associate the mobile device number (MDN) or phone number to the fraudster's mobile communication device). The fraudster may then use an automated (computer based) interface to open a credit card provided by a financial institution in the name of the victim, run up charges on the credit card, and then call the wireless service provider back to perform a reverse device swap (i.e., restore the MDN to the victim's mobile communication device). When the fraudster requests the transaction, the automated system may challenge him to provide his mobile phone number as a authentication credential and may even send codes to the mobile phone number (via text, via voice message, or other) and request the fraudster to enter the code into the automated interface. Thus, the fraudster uses the phone swap as a mechanism for subverting or bypassing the authentication based on mobile phone possession.

The present disclosure teaches a system and method of thwarting this kind of fraud by expressly monitoring for too frequent or otherwise anomalous phone swaps, because it has been observed that such anomalous phone swaps may often be motivated by the desire to subvert financial security mechanisms. The wireless communication service provider will keep records of device swaps in a device swap data store. In the event of a request to swap a mobile communication service and phone number between devices, an application executing on a server will search the device swap data store based on both the hardware identity of the source device (i.e., the mobile communication device initially associated to the MDN) and the hardware identity of the destination device (i.e., the device to which the MDN is being requested to be swapped to associate to). The hardware identity may then be used to search the device swap data store. A history of previous swaps associated with either of the two involved devices is analyzed. If an anomalous number of swaps have been performed for either the source device or the target device, a variety of actions can be taken.

Actions can involve one or more specific steps, depending on the deviation of the specific swapping history from normal. For example, the request to swap the MDN between the devices may be delayed for a period of time, for example for a day. The time delay may provide a window for further analysis. As another example, the will of the account holder to perform the swap may be corroborated through one or more communication paths independent of the source mobile communication device, for example via an email account registered to the subscriber, via an office phone number registered to the subscriber, and via a different device and MDN associated with the same account holder (e.g., a spouse's phone in a family wireless communication subscription plan). If all the communication paths corroborate the will of the subscriber, then the swap may be completed. As another example, a customer care representative may ask the swap requestor to explain why he or she is swapping phones so frequently. In some cases, the communication service may be blocked, and the user may be directed to meet with a technician at a retail store of the wireless communication service provider. In an embodiment, the action or combination of actions taken based on the analysis of the swap histories may be defined as a policy or rule by each financial institution for application by the wireless communication service provider.

In addition, the application executing on the server may determine a risk score associated with the MDN and/or with the hardware identities of mobile communication devices, based at least on the swap history of the hardware identities of devices. A financial institution may send a request to the application to provide the risk score to the institution before an individual associated with an MDN opens an account and/or requests a financial transaction. The application may provide an application programming interface (API) that can be automatically queried by a computer system operated by the financial institution, possibly an application that manages a user interface to open accounts and make account transactions that is accessible via a web page to the public. The application may search the data store to determine how many times a mobile communication device has been involved in a phone swap during a period of time. The search may involve a two-step process. The application may be provided an MDN by the financial institution that is requesting the risk score, and the application may look up the hardware identity of the mobile communication device in a provisioning data base using the MDN as an index or search key. The score may range from low risk to high risk. The score may take on a range of numeric values, for example from 1 to 10, 1 to 100, or 1 to 1000, from 0 to 10, 0 to 100, or 0 to 1000, or some other range of values. The financial institution may apply the risk score differently for different types or classes of transactions.

Turning now to FIG. 1, a communication system 100 is described. In an embodiment, the system 100 comprises a first user equipment (UE) 102 having a first hardware identity 103, a second UE 104 having a second hardware identity 105, and a mobile device number (MDN) 106. A UE 102 may also be referred to as a mobile communication device. Hardware identities 103, 105 may be one or more of a mobile equipment identity (MEID), an electronic serial number (ESN), or other hardware identifiers. An MDN may be referred to as a phone number in some contexts.

As is known to one skilled in the art, an MDN may not be physically in the UE 102, 104 but rather may be a reference or index that is used for establishing a communication link to the UE 102, 104, for example for identifying an enhanced node B (eNB) 108 in whose coverage area the UE 102, 104 is presently located, while the hardware identity 103 or 105 may be used by the eNB 108 to page and establish a communication session with the UE 102, 104. The MDN 106 may be associated to the hardware identity 103 or 105 in a provisioning data store 109 maintained by a wireless communication service provider and used to route communications addressed to the MDN 106 to the UE 102, 104. As illustrated in FIG. 1, the MDN 106 had been initially associated to the first hardware identity 103 and first UE 102 but that association has been destroyed (the crossed out association arrow) and now the MDN 106 is associated to the second hardware identity 105 and the second UE 104 (the other arrow). The UEs 102, 104 may comprise mobile communication devices, mobile smart phones, wearable computers, headset computers, laptop computers, notebook computers, or tablet computers.

The system 100 further comprises a network 110, a plurality of customer care workstations 112, a server computer 114 executing a device swap monitor application 116, and a device swap data store 118. The device swap monitor application 116 may provide services to a plurality of financial institutions 120 or other third parties, as discussed further hereinafter. The network 110 may comprise one or more public networks, one or more private networks, or a combination thereof. The customer care workstations 112, the server 114, and the financial institutions 120 may be implemented as computer systems. Computer systems are described further hereinafter. While two UEs 102, 104 and one eNB 108 are illustrated in FIG. 1, it is understood that the system 100 may comprise any number of UEs and eNBs.

A phone swap is illustrated conceptually at the top of FIG. 1. The MDN 106 initially associated to the first hardware identity 103 (i.e., associated to the first UE 102) in the provisioning data store 109 is changed, in the provisioning data store 109, to associate to the second hardware identity 105 (i.e., to associate to the second UE 104). This may have been affected by a subscriber calling a customer care center maintained by the wireless communication service provider and requesting a care agent make the change. For example, the care agent may use the customer care workstation 112 to change the provisioning of the MDN 106 association to a hardware identity, from the first hardware identity 103 to the second hardware identity 105. When this phone swap is performed, the system 100 captures information related to the swap in the device swap data store 118. For example, a provisioning application used to modify the provisioning data store 109 may store the information in the device swap data store 118. Alternatively, the provisioning application may send the information to the device swap monitor application 116, and the device swap monitor application 116 may store the information in the device swap data store 118.

Phone swaps are most often normal. Phone swaps may occur when a subscriber upgrades his or her phone to a later model. Many subscribers upgrade phone every two years or even more often. If a wireless communication service provider has about 50 million user lines, this suggests that 25 million phone upgrades may be completed per year. But some phone swaps can be made pursuant to a form of identity theft.

For example, an identity thief may learn information about the first UE 102 and a subscriber associated with the first UE 102. The identity thief would then call customer care to request the MDN 106 be swapped from the first UE 102 to refer to the second UE 104, where the identity thief has physical possession of the second UE 104. The identity thief may then provide sufficient information to the customer care agent to authenticate himself and provide the second hardware identity 105 associated with the second UE 104. The customer care agent, using the customer care workstation 112, performs the swap by using the provisioning application (not shown) to change the association in the provisioning data store 109 to associate the MDN 106 to the second hardware identity 105 of the second UE 104. At this point, the identity thief may use his own phone, the second UE 104, to complete fraudulent financial transactions with the financial institution 120 based on the stolen identity of the true subscriber associated with the first UE 102. For example, the identity thief may open a credit card in the name of the true subscriber and make credit card purchases. After monetizing the identity theft, the identity thief may call back to customer care and request that the MDN 106 be associated back to the first hardware identity 103 (e.g., swap the phones in the reverse direction), to conceal his actions. The identity thief may perform this cycle many times during a single day swapping a plurality of MDNs from different "legitimate" phones to his phone, temporarily, and then monetize the identity theft.

In system 100, every phone swap is recorded in the device swap data store 118. In an embodiment, the device swap monitor application 116 analyzes the contents of the device swap data store 118 to identify anomalies or abnormal swapping activities. For example, if the second UE 104 belongs to an identity thief, the second hardware identity 105 may be associated with a large number of swaps in the device swap data store 118. For example, the second hardware identity 105 may be associated with tens of swaps or even hundreds of swaps over a short time period, such as over a week. The device swap monitor application 116 may score each hardware identity associated with a phone swap event in the device swap data store 118. The score may be referred to as a risk score and may range from 1 to 10, 1 to 100, 1 to 1000, 0 to 10, 0 to 100, 0 to 1000 or some other numerical range. In an embodiment, a higher score may associate to more frequent phone swapping and hence a higher risk of being engaged in identity theft activities, and a lower score may associate to less frequent phone swapping and hence a lower risk of being engaged in identity theft activities. Alternatively, the sense of the scale may be reversed: a higher score may be associated with lower risk of being engaged in identity theft, and a lower score may be associated with higher risk of being engaged in identity theft.

The device swap monitor application 116 may recalculate the risk scores periodically, for example every hour, every day, every week, or some other periodic interval. Alternatively, the device swap monitor application 116 may recalculate the risk score associated with the hardware identities 103, 105 involved in a phone swap on the event of the phone swap. In an embodiment, calculation of the risk score associated with a hardware identity may not be performed unless a threshold number of swaps have been recorded for the hardware identity within a predefined time period, for example 3 or more swaps within a 30 day period of time. Some other predefined threshold may be used to eliminate calculating risk scores for the vast majority of phone swaps which are merely users upgrading UEs.

The financial institutions 120 may send a request to the wireless communication service provider to obtain risk scores associated with an MDN 106. For example, an individual may seek to open a financial account such as a credit card and may list an MDN. The financial institution 120 may operate a computer system that accesses an application programming interface (API) of the device swap monitor application 116 to obtain a risk score associated with an MDN that is provided in the API call. The device swap monitor application 116 may search the device swap data store 118 to find a risk score associated with the MDN. This may involve the device swap monitor application 116 first accessing the provisioning data store 109 to determine what hardware identity is current associated with the MDN, and then using the currently associated hardware identity to index into the device swap data store 118 to obtain the risk score. Alternatively, the device swap monitor application 116 may determine the risk score on the event of receiving a request for the risk score from the financial institution. The API of the device swap monitor application 116 may then return the risk score to the financial institution 120, and the financial institution may block the requested transaction if the risk score is too high, require further identifying credentials from the transaction requestor, or restrict transactions to a short list of allowed transactions.

In an embodiment, the device swap monitor application 116 may be engaged by the customer care workstation 112 during the course of a device swap process. For example, the device swap monitor application 116 may be requested to evaluate the proposed device swap before the MDN 106 is disassociated from the first hardware identity 103 and associated to the second hardware identity 105, allowing the device swap monitor application 116 to take action on the proposed swap process.

In an embodiment, the action may include delaying the swap process, for example delaying the swap for a day or several hours. Such a delay may provide an opportunity to the wireless communication service provider to perform additional verification checks. For example, the user of the first UE 102 that is purportedly requesting the device swap may be contacted via alternative communication paths to corroborate the requested swap. The user may be contacted through an email account or via a work phone number. The user may be contacted via a secondary party associated with the user, for example via a spouse who has a second line on the same subscription account. If the verification through the alternative communication path is obtained, the swap may be performed.

In an embodiment, the action may include a care agent asking the purported user to explain why he or she is swapping the devices, for example in the case when an unusually high number of swaps have been conducted in a brief period of time for the target UE (i.e., the UE 104 as illustrated in FIG. 1: the device to which the MDN is to be re-associated to). If the explanation is not convincing, the swap request may be refused. Further, the subscription account and/or line may be locked, and the user may be required to go to a retail store of the wireless communication service provider to take remediating action of some sort.

Figure 2:
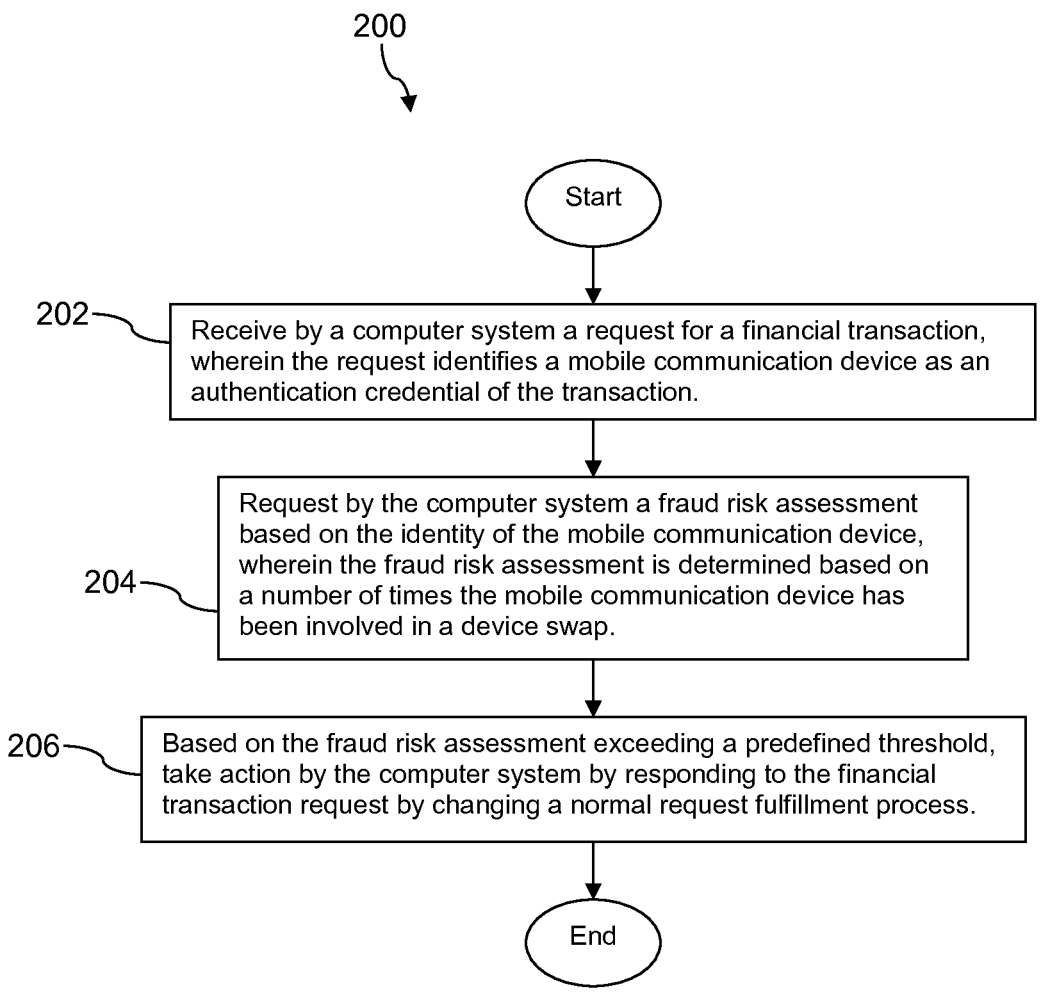
FIG. 2 is a flow chart of a method according to an embodiment of the disclosure.

Turning now to FIG. 2, a method 200 is described. At block 202, receive by a computer system a request for a financial transaction, wherein the request identifies a mobile communication device as an authentication credential of the transaction. For example, the computer system of the financial institution executing a financial transactions application receives a transaction request from an individual to open a new financial account or to complete a transaction on an existing account. Alternatively, the financial transaction may be opening a new credit card account, opening a new customer purchasing account, transferring money from an existing account, or reading a current account balance. The user may provide an MDN of a mobile communication device. At block 204, request by the computer system a fraud risk assessment based on the identity of the mobile communication device. For example, the financial institution 120 requests the risk score using an API of the device swap monitor application 116. The risk score may be determined based on a number of times the mobile communication device has been involved in a device swap. At block 206, based on the fraud risk assessment exceeding a predefined threshold, take action by the computer system by responding to the financial transaction request by changing a normal request fulfillment process. For example, the financial institution 120 refuses to open a new account or requires additional corroboration and authentication of the individual's identity. Alternatively, the financial institution 120 may delay the transaction or account opening or may require the individual to present himself or herself in person at a branch office to complete the account opening or transaction in person.

Figure 3:
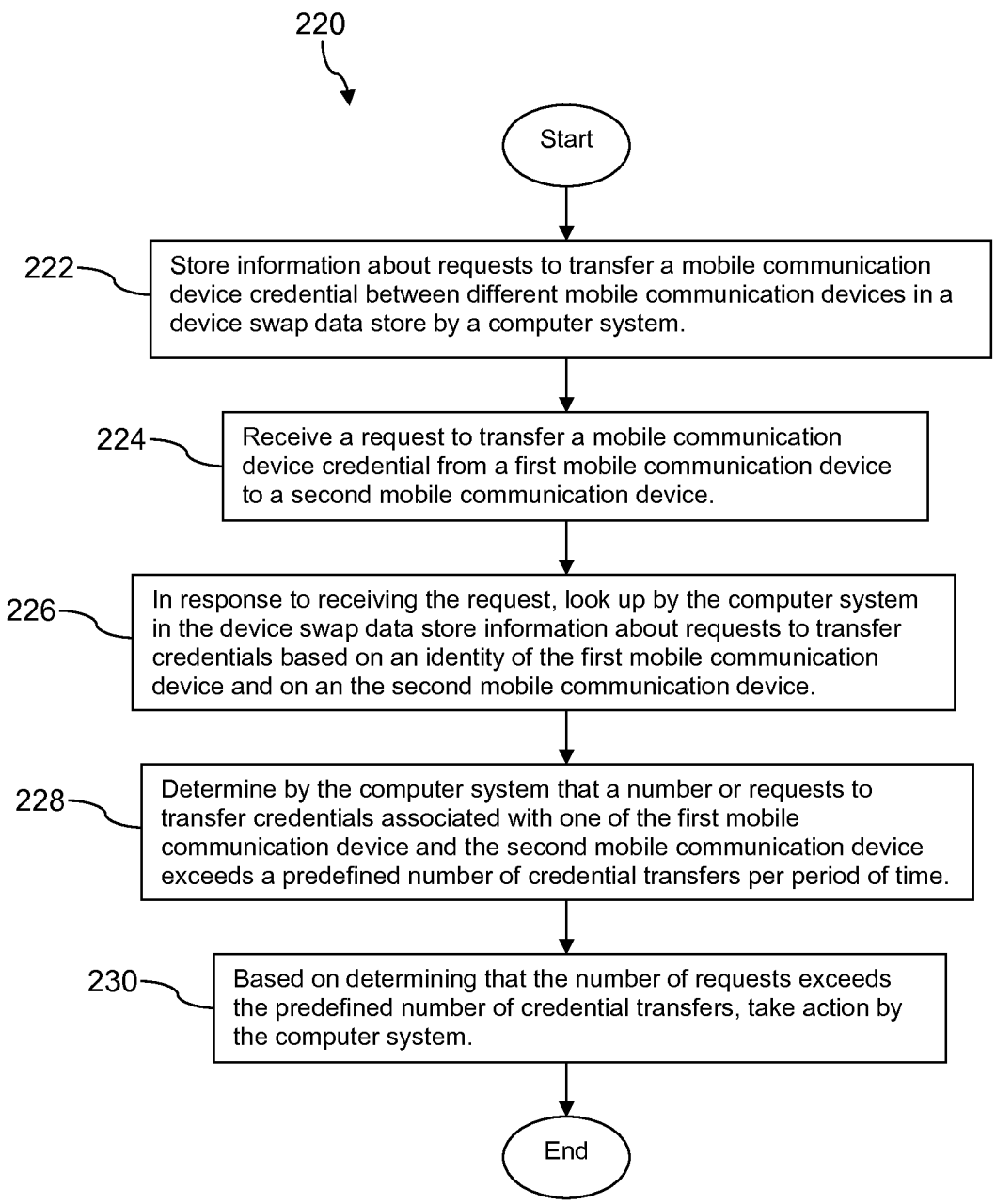
FIG. 3 is a flow chart of another method according to an embodiment of the disclosure.

Turning now to FIG. 3, a method 220 is described. At block 222, store information about requests to transfer a mobile communication device credential (e.g., the MDN 106) between different mobile communication devices in a device swap data store by a computer system. For example, the device swap monitor application 116 executing on the server 114 stores the information in the device swap data store 118. At block 224, receive a request to transfer a mobile communication device credential from a first mobile communication device to a second mobile communication device. At block 226, in response to receiving the request, look up by the computer system in the device swap data store information about requests to transfer credentials based on an identity of the first mobile communication device and on the second mobile communication device. For example, a provisioning application invokes an API of the device swap monitor application 116, and the device swap monitor application 116 looks up device swap records associated with the MDN and/or the hardware identities. At block 228, determine by the computer system that a number of requests to transfer credentials associated with one of the first mobile communication device and the second mobile communication device exceeds a predefined number of credential transfers per period of time. For example, the device swap monitor application 116 determines that too many credential transfers have been completed per period of time. At block 230, based on determining that the number of requests exceeds the predefined number of credential transfers, take action by the computer system. For example, the request to transfer credentials (e.g., to provision the MDN 106 to the different mobile communication device) is refused or delayed. For example, the will of the true user of the mobile communication device is determined through communication via alternative communication channels such as email, office phone, or by placing a phone call to another person associated with the true user.

Figure 4:
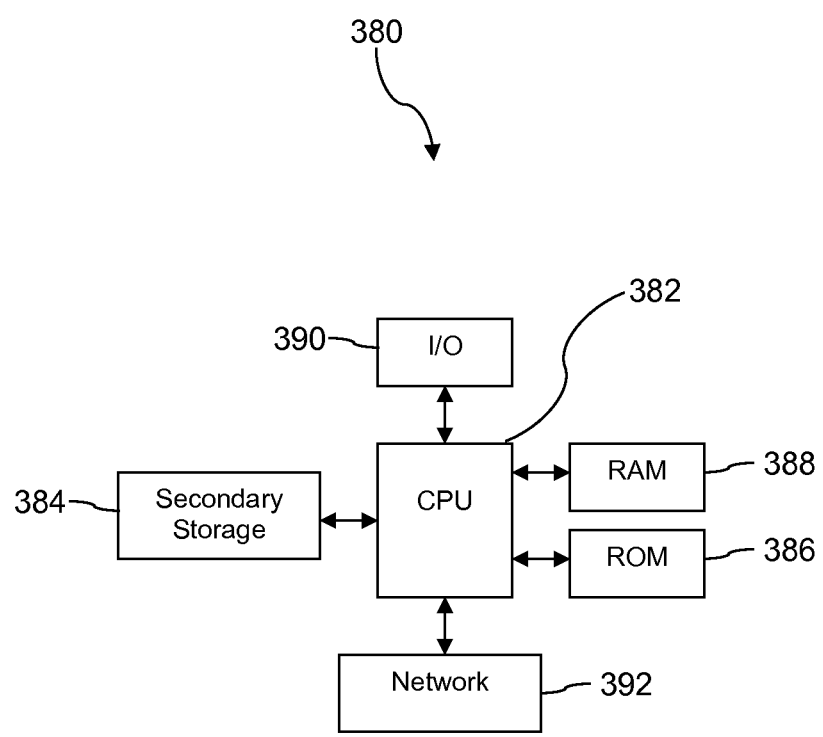
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of mitigating identity theft based on monitoring mobile communication device identity swapping, comprising:
    storing information about requests to transfer a mobile communication device credential between different mobile communication devices in a device swap data store by a computer system;
    receiving, by the computer system, a request to transfer a mobile communication device credential from a first mobile communication device to a second mobile communication device;
    in response to receiving the request and prior to transferring credentials between the first mobile communication device and the second communication device:
        determining, by the computer system, an identity of the first mobile communication device;
        determining, by the computer system, an identity of the second mobile communication device;
        looking up, by the computer system in the device swap data store, information about requests to transfer credentials based on the identity of the first mobile communication device and on the identity of the second mobile communication device; and
        determining, by the computer system, that a number of requests to transfer credentials associated with at least one of the first mobile communication device or the second mobile communication device exceeds a predefined number of credential transfers per period of time, the determination being an indicator of potential fraud by a user providing the request to transfer the mobile communication device credential from the first mobile communication device to the second mobile communication device; and
    based on determining that the number of requests exceeds the predefined number of credential transfers, taking action by the computer system.

2. The method of claim 1, wherein the information about requests to transfer the mobile device credential between different mobile communication devices comprises a hardware identity of each device.

3. The method of claim 1, wherein the mobile communication device credential is a mobile device number (MDN).

4. The method of claim 1, wherein the mobile communication devices are one of a smart phone, a headset computer, a wearable computer, a laptop computer, a tablet computer, or a notebook computer.

5. The method of claim 1, wherein the action taken by the computer system comprises blocking the transfer of the credentials between the devices.

6. The method of claim 1, wherein the action taken by the computer system comprises delaying the transfer of the credentials between the devices.

7. The method of claim 1, wherein the action taken by the computer system comprises corroborating an intent of a user of one of the mobile communication devices to transfer the mobile communication device credential between the devices through communication via an email, an office phone, or a family member phone.

* * * * *